United States Patent
Van Aelten et al.

(10) Patent No.: US 6,349,282 B1
(45) Date of Patent: Feb. 19, 2002

(54) COMPOUND WORDS IN SPEECH RECOGNITION SYSTEMS

(75) Inventors: Filip Van Aelten, Merelbeke (BE); Douglas Napoleone, Somerville; William F. Ganong, III, Brookline, both of MA (US); Hugo Van Hamme, Wemmel (BE); Michel Boekestein, Veenendaal (NL)

(73) Assignee: Larnout & Hauspie Speech Products N.V., Ieper (BE)

( * ) Notice: Subject to any disclaimer, the term of this patent is extended or adjusted under 35 U.S.C. 154(b) by 0 days.

(21) Appl. No.: 09/295,424

(22) Filed: Apr. 20, 1999

(51) Int. Cl.[7] .............................................. G10L 15/18
(52) U.S. Cl. ...................................... 704/257; 704/255
(58) Field of Search ................................ 704/200, 231, 704/255, 251, 256, 257, 252, 254, 9, 10

(56) References Cited

U.S. PATENT DOCUMENTS

| | | | | |
|---|---|---|---|---|
| 4,914,590 A | * | 4/1990 | Loatman et al. | 364/419 |
| 5,510,981 A | * | 4/1996 | Berger et al. | 364/419.02 |
| 5,754,972 A | * | 5/1998 | Baker et al. | 704/200 |
| 5,768,603 A | * | 6/1998 | Brown et al. | 395/759 |
| 5,797,122 A | * | 8/1998 | Spies | 704/255 |
| 6,173,253 B1 | * | 1/2001 | Abe et al. | 704/10 |

FOREIGN PATENT DOCUMENTS

| | | |
|---|---|---|
| DE | 195 10 083 A1 | 9/1996 |
| EP | 0 508 225 A2 | 10/1992 |
| EP | 0 566 848 A2 | 10/1993 |
| WO | WO 93/18506 | 9/1993 |

OTHER PUBLICATIONS

ICASSP–95., 1995 International conference on Acoustics, Speech, and Signal Processing. Geutner, "Using morphology towars better large–vocabulary speech recognition systems". pp. 445–448, May 1995.*

Spoken Language, 1996. Benton et al., "Compound words in large–vocabulary German Speech recognition systems". pp. 1165–1168. Oct. 1996.*

Berton, Andre' et al, "Compound Words in Large–Vocabulary German Speech Recognition Systems", In Proc. ICSLP. 1996, Philadelphia, Pennsylvania, USA, pp. 1165–68.

Spies, Marcus, "A Language Model for Compound Words in Speech Recognition", ESCA Eurospeech '95 4th European Conference on Speech Communication and Technology, Madrid, Sep. 1995, pp. 1767–1770.

* cited by examiner

Primary Examiner—Richemond Dorvil
(74) Attorney, Agent, or Firm—Bromberg & Sunstein LLP

(57) ABSTRACT

An automatic speech recognition system includes a recognition engine, a compound lexicon, and a compounder. The recognition engine generates a recognition result having a sequence of recognized words representative of an input utterance. The words in the recognition result include compound word components which may be combined to form compound words. The engine uses a recognition vocabulary of words and a language model which, for a given position in the sequence of recognized words and for selected words in the recognition vocabulary, associates a likelihood of such word occurring at such position. The compound lexicon contains a plurality of compound word components and component connecting links structured so that links are present between components that are more likely to occur together than to occur as separate words. The compounder replaces adjacent words in the sequence of recognized words which have corresponding linked components in the lexicon with a concatenation of the corresponding linked components. The probabilities in the language model minimize the likelihood of a component in the lexicon occurring in the recognition result without a corresponding linked component for concatenation.

52 Claims, 1 Drawing Sheet

COMPOUND WORDS IN SPEECH RECOGNITION SYSTEMS

TECHNICAL FIELD

The present invention relates generally to speech recognition systems, and in particular, to the handling of compound words in the recognition results of such systems.

BACKGROUND ART

Computer recognition of speech is field of great complexity. Speech recognition poses difficult problems in many areas, and while never easy, individual languages have different problems which affect overall recognition successfulness. For several years, speech recognition systems were "isolated word" and required a user to pause between words. With increased computer power available, and ever more sophisticated recognition techniques, commercially available speech recognition systems are now "large vocabulary continuous" in which no pausing is required between words. In fact, such systems are even more accurate when a user does not pause between words, but speaks in multiple word phrases. However, with the advent of large vocabulary continuous speech recognition systems, new problems have emerged which did not exist or were not equally significant in isolated word recognition systems.

One such problem is how to deal with compound words—that is, words formed by concatenating component word parts. Some languages, such as German and Dutch, have a relatively high percentage of compound words. As an example, the Dutch word "rentevoet" is a compound formed of constituent component parts "rente" and "voet" Such compound words may form a significant fraction of all the "out of vocabulary" (OOV) words encountered by a recognition system. However, attempting to include such compound words in the system recognition vocabulary greatly increases the size of the recognition vocabulary.

SUMMARY OF THE INVENTION

A preferred embodiment of the present invention provides a postprocessor of a speech recognition system for generating compound words from a recognition result having a sequence of recognized words representative of an input utterance, the sequence including compound word components. The postprocessor has a compound lexicon and a compounder. The compound lexicon contains a plurality of compound words composed of compound word components and connecting links. The compounder replaces, in the sequence of recognized words, adjacent words that have corresponding linked components in the lexicon with a compound word in the compound lexicon composed of the adjacent words.

In a further embodiment, the replacement with the compound word may include an adjustment of the components for agreement for at least one of number, person, gender, and tense, or the addition of component-linking morphemes. The components may have a length greater than or equal to a selected minimum component length. The compound word entries in the compound lexicon may also include an ambiguity indicator field having a value indicating whether the components for a given compound word occur more frequently in compounded or uncompounded form.

In another further embodiment, the compounder may produce an output representing a best recognition hypothesis and at least one alternative recognition hypothesis, such that when the compounder performs a given compound word replacement, one hypothesis is generated that contains the given compound word, and one hypothesis is generated that contains the uncompounded components of the given compound word. In such an embodiment, when the compounder performs a compound word replacement, the best recognition hypothesis either may contain the given compound word, or alternatively, the best recognition hypothesis may contain the uncompounded components of the given compound word.

In an embodiment, the compound lexicon may contain a given compound word only when the components of the given compound word are more likely to occur together in a compound word than to occur as separate words. The compound lexicon also may contain a selected number of most frequently occurring compound words present in a text corpus.

A related embodiment includes an automatic speech recognition system having the postprocessor of one of the above embodiments. The automatic speech recognition system may be a large-vocabulary continuous speech recognition system.

Another preferred embodiment includes a method of a speech recognition system for postprocessing a recognition result having a sequence of recognized words representative of an input utterance so as to generate compound words, the sequence including compound word components. The method includes providing a compound lexicon that contains a plurality of compound words composed of compound word components and connecting links, and replacing, in the sequence of recognized words, adjacent words that have corresponding linked components in the lexicon with a compound word in the compound lexicon composed of the adjacent words.

In a further related embodiment, replacing with the compound word may include adjusting the components for agreement for at least one of number, person, gender, and tense, or adding component-linking morphemes. The components may have a length greater than or equal to a selected minimum component length The compound word entries in the compound lexicon may also include an ambiguity indicator field having a value indicating whether the components for a given compound word occur more frequently in compounded or uncompounded form.

In a further related embodiment, replacing with a compound word may include producing an output representing a best recognition hypothesis and at least one alternative recognition hypothesis, such that when replacing a given compound word, one hypothesis is generated that contains the given compound word, and one hypothesis is generated that contains the uncompounded components of the given compound word. In such an embodiment, when replacing a given compound word, the best recognition hypothesis may contain the given compound word, or alternatively, the best recognition hypothesis may contain the uncompounded components of the given compound word.

In an embodiment, the compound lexicon may contain a given compound word only when the components of the given compound word are more likely to occur together in a compound word than to occur as separate words. Or, the compound lexicon may contain a selected number of most frequently occurring compound words present in a text corpus.

An embodiment also includes an automatic speech recognition system using the method of one of the above embodiments. In such an embodiment, the system may be a large-vocabulary continuous speech recognition system.

Another preferred embodiment includes an automatic speech recognition system having a recognition engine, a compound lexicon and a compounder. The recognition engine generates a recognition result having a sequence of recognized words representative of an input utterance, the sequence including compound word components. The engine uses a recognition vocabulary of words and a language model which, for a given position in the sequence of recognized words and for selected words in the recognition vocabulary, associates an occurrence probability of such word occurring at such position. The compound lexicon contains a plurality of compound words composed of compound word components and connecting links. The compounder replaces, in the sequence of recognized words, adjacent words that have corresponding linked components in the lexicon with a compound word in the compound lexicon composed of the adjacent words. In addition, the language model occurrence probabilities prevent a given component in the lexicon from occurring in the recognition result unless the given component is adjacent to at least one other component such that, for the adjacent components, the lexicon contains linked entries corresponding to a compound word in the lexicon.

In a further related embodiment, the replacement with the compound word may include an adjustment of the components for agreement for at least one of number, person, gender, and tense, or the addition of component-linking morphemes. The compound components may have a length greater than or equal to a selected minimum component length. The compound word entries in the compound lexicon may include an ambiguity indicator field having a value indicating whether the components for a given compound word occur more frequently in compounded or uncompounded form.

In another related embodiment, the compounder may produce an output representing a best recognition hypothesis and at least one alternative recognition hypothesis, such that when the compounder performs a given compound word replacement, one hypothesis is generated that contains the given compound word, and one hypothesis is generated that contains the uncompounded components of the given compound word. In such an embodiment, when the compounder performs a compound word replacement, the best recognition hypothesis may contain the given compound word, or alternatively, the best recognition hypothesis may contain the uncompounded components of the given compound word.

In an embodiment, the compound lexicon may contain a given compound word only when the components of the given compound word are more likely to occur together in a compound word than to occur as separate words. The compound lexicon may contain a selected number of most frequently occurring compound words present in a text corpus. In addition, each compound word may further include an occurrence probability of such compound word occurring at the location of the compound word in the sequence of recognized words. In such case, the occurrence probability of each compound word may be determined based on the occurrence probability of one of the components composing that compound word. The system may be a large-vocabulary continuous speech recognition system.

Another preferred embodiment includes a method of automatic speech recognition. The method includes generating with a recognition engine a recognition result having a sequence of recognized words representative of an input utterance, the sequence including compound word components, the engine using a recognition vocabulary of words and a language model which, for a given position in the sequence of recognized words and for selected words in the recognition vocabulary, associates an occurrence probability of such word occurring at such position, providing a compound lexicon, the lexicon containing a plurality of compound words composed of compound word components and connecting links, and replacing, in the sequence of recognized words, adjacent words that have corresponding linked components in the lexicon with a compound word in the lexicon composed of the adjacent words, wherein the language model occurrence probabilities prevent a given component in the lexicon from occurring in the recognition result unless the given component is adjacent to at least one other component such that, for the adjacent components, the lexicon contains linked entries corresponding to a compound word in the lexicon.

In a further related embodiment, replacing with the compound word may include adjusting the components for agreement for at least one of number, person, gender, and tense, or adding component-linking morphemes. The components may have a length greater than or equal to a selected minimum component length. The compound word entries in the compound lexicon may also include an ambiguity indicator field having a value indicating whether the components for a given compound word occur more frequently in compounded or uncompounded form.

In an embodiment, replacing with a compound word may include producing an output representing a best recognition hypothesis and at least one alternative recognition hypothesis, such that when replacing a given compound word, one hypothesis is generated that contains the given compound word, and one hypothesis is generated that contains the uncompounded components of the given compound word. When replacing a given compound word, the best recognition hypothesis may contain the given compound word, or alternatively, the best recognition hypothesis may contain the uncompounded components of the given compound word.

In an embodiment, the compound lexicon may contain a given compound word only when the components of the given compound word are more likely to occur together in a compound word than to occur as separate words. Each compound word may further include an occurrence probability of such compound word occurring at the location of the compound word in the sequence of recognized words. In such case, the occurrence probability of each compound word may be determined based on the occurrence probability of one of the components composing that compound word. The system may be a large-vocabulary continuous speech recognition system.

Another preferred embodiment includes a method of preparing a speech recognition system to postprocess a recognition result having a sequence of recognized words representative of an input utterance so as to generate compound words, the sequence including compound word components, the system having a language model including n-gram word models. The method includes providing an initial component lexicon, the initial component lexicon containing a plurality of compound word components, comparing a corpus of words modeled by the system to the initial component lexicon, creating entries in a compound lexicon for compound words in the corpus having compound word components in the initial component lexicon, thereby creating a compound lexicon that contains a plurality of compound words composed of compound word components and connecting links, and rewriting the language model n-grams of the compound words so as to form n-grams of the components.

In such an embodiment, providing an initial component lexicon may also include providing a compound grammar specifying how compound word components may be combined into compound words. The compound grammar may use rules based on a part-of-speech characteristic of each component.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figures 1, 2, 3:
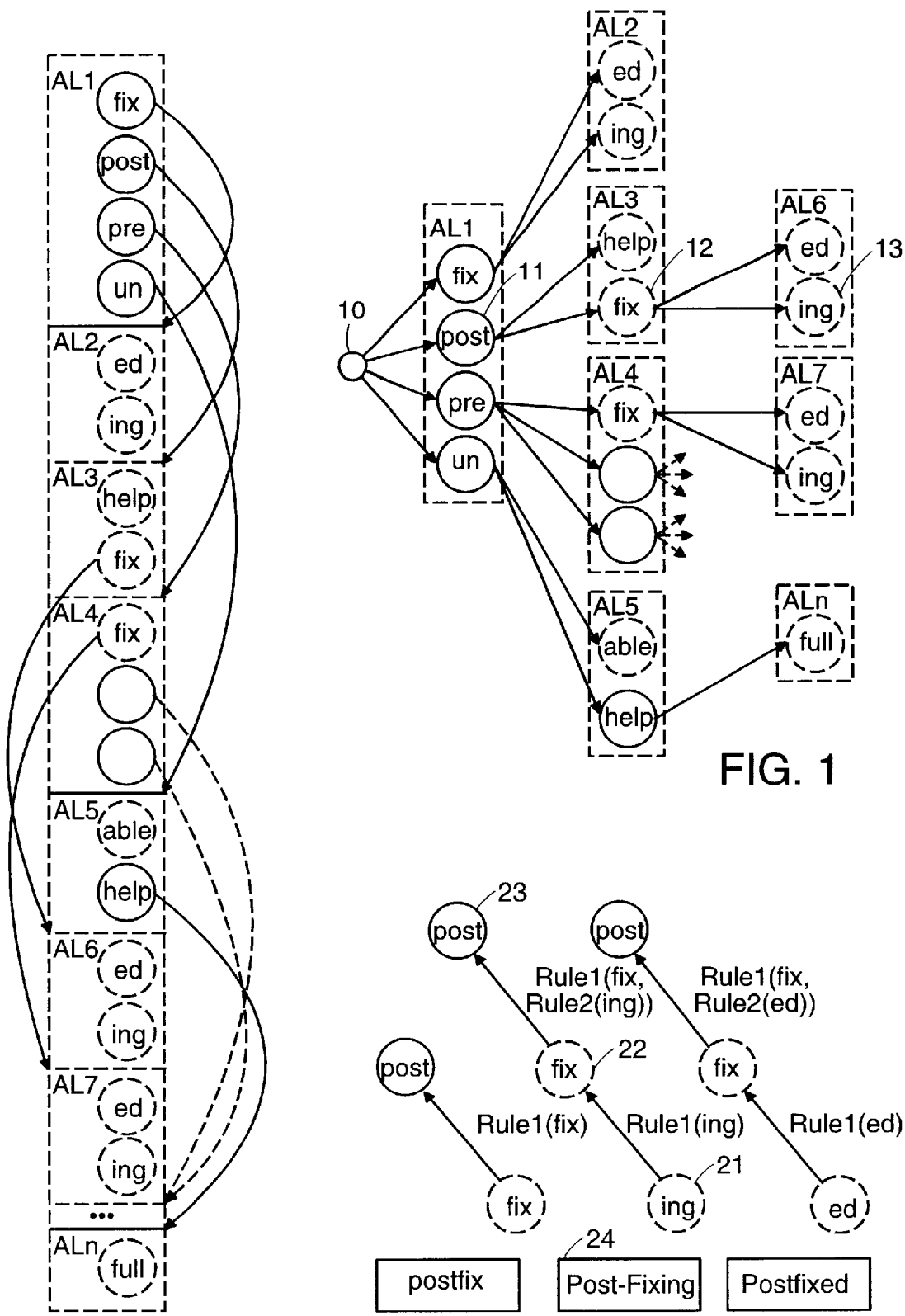
FIG. 1 illustrates a portion of a compound component structure according to a preferred embodiment of the present invention.
FIG. 2 illustrates use of compound structure data flags for constituent component agreement according to a preferred embodiment.
FIG. 3 illustrates an internal compacted memory structure of a compound component grammar according to a preferred embodiment.

A preferred embodiment of the present invention includes an approach of a continuous speech recognition system for handling compound words present in the recognition result. This avoids an explosion of the recognition vocabulary by incorporating into the recognition vocabulary the constituent components of compounds rather than the compounds themselves. After the system has recognized a given utterance, any compound components present in the recognition result are recompounded using a separate compound lexicon that associates strings of components with compounds. The compound lexicon is limited in size, but has maximal impact on system performance.

The compounding process of a preferred embodiment may be implemented by using a decompounding process to produce the language model and recognition vocabulary for the recognition engine. First, an initial compound component lexicon is created by hand—a linguist takes lists of compound words and extracts shorter constituent components. Using a linguist to create the initial lexicon by hand avoids nonsensical decompounding. The initial lexicon is also annotated with part-of-speech information regarding whether a given constituent component is a verb, adjective, etc. The creator of the initial lexicon also writes a compound grammar in terms of parts-of-speech—e.g., specifying that a given compound is a sequence of (any number of ) nouns. Thus, the result of the initial decompounding is a constituent component lexicon and a compounding grammar.

The annotated initial lexicon (words+part-of-speech) is used together with the compound grammar to analyze a word list extracted from the very large text corpus that is used for language modeling and vocabulary construction. Every word in the corpus that can be decompounded, is, according to the grammar and the initial lexicon. This results in the system compound lexicon which lists compound words and their constituent components. This compound lexicon can be filtered so that if the occurrence probability in the word-level n-gram list of a given sequence of separate components exceeds a threshold value, the corresponding compound is left out of the compound lexicon. Furthermore, the compound lexicon can be limited in size to include only the X (e.g., 200 K) most frequent compounds in the text corpus. Linking morphemes may be added to a preceding constituent component. This may result in a non-existing word, but this undesired result is avoided in the manner used to protect against spurious recognition results.

Given the compound lexicon, all language model n-grams extracted from the test corpus are rewritten so as to be n-grams on the constituent components. This form of decompounding is basically a table look up—look for the compound in the table, and if found, replace it with the corresponding components. The decompounded n-grams are processed as usual, yielding a recognition vocabulary and language model for the recognition engine.

As an additional feature, when compounding a set of words, one or more constituent components can be annotated as being the main contributors to the compound. That is, there will always be a core component in the compound from which the attributes of the compound are based. In German, for example, a compound usually consists of a noun with verbs, adjectives, or other nouns prefixed. The resulting compound word behaves as a noun. Identifying such contributor patterns is important for compounding in a system which applies language model rescoring after a compound is encountered.

An embodiment using language model rescoring may store only the language model statistics for the main contributor component and use a transform calculation to determine statistics for compound word forms. For example, in English, an adjective "factual" compounded with a secondary component "ly" transforms the resulting compound "factually" into an adverb. An embodiment may store the language model statistics for the main contributor component "factual" only, and apply a transform calculation to account for its use as an adverb. Some languages may require identifying a main component contributor and secondary component contributors. Such secondary contributors may be identified as those components which change the part-of-speech of a compound from that of the primary contributor (as in the previous example).

FIG. 1 illustrates a portion of a compound component structure according to a preferred embodiment of the present invention. Compounding starts with a recognition result input of, for example, "post" "fix" "ing" from the recognition engine. First, all the arcs off the root node 10 are searched to find the node for "post" 11. Then, all the arcs off of "post" 11 are searched to find the node for "fix" 12. All the arcs off of "fix" 12 are searched to find the node for "ing" 13, which is a leaf node.

Compounding is performed by tracing back the path as shown in FIG. 2 which illustrates use of compound structure data flags for constituent component agreement according to a preferred embodiment. The data flags stored in "ing" 21 are used to determine changes to "ing" 21 and "fix" 22. The data flags stored in "ing" 21 and "fix" 22 are used to determine changes to "fix" 22 and "post" 23. The data flags stored in "ing" 21, "fix" 22, and "post" 23 are used to determining changes to "fix" 21 and "post" 22. The resulting output is the compound "post-fixing" 24. The "-" in the compound "post-fixing" 24 is a linking morpheme. Languages such as Dutch have many such linking morphemes such as: "-", "e", "en ", "s". In the preferred embodiment, the only linking morphemes treated as such are ones that do not change pronunciation. Linking morphemes that do change pronunciation are attached to the previous component. This could result in a "word" being present in the recognition output that does not really exist in the language, but that may be avoided in the manner used to protect against spurious recognition results.

Decompounding can also be described with reference to FIG. 1. Assume an input of "post-fixing." First, search all the arcs off the root node 10 for those nodes which start "post-fixing". The search finds "post" 11. Next, construct the next problem as "fixing". Search all the arcs off of "post" 11 for nodes starting "fixing". The search finds "fix" 12. Then, construct next the problem as "ing". Search all the arcs off of "fix" 12 for those starting "ing". The search finds "ing" 13 which completes the compound. The result is: "post" "fix" "ing"

In the case of decompounding, it is usual to have a network of partial solutions while searching the compound network tree. This occurs when faced with words like "eerstejaars" which is made up of "eerste" and "jaars". However, starting from the beginning of the compound, the constituent component "eerst" is also valid, but such a decompounding path fails further analysis since "ejaars" is not a valid constituent component (or a sequence of such components). A new network is constructed and all the paths along the tree are found which will exactly complete "eerstejaars" (possibly more than one). Then, it is decided which path is the desired decompounded form. Possible solutions include taking the shortest path—which, because the search is level-based, is the first complete path found—or, taking the longest path, which is typically the last path found.

FIG. 3 illustrates an internal compacted memory structure of a compound grammar according to a preferred embodiment. A memory efficient compression coding of the compound lexicon is employed that goes from a full ASCII description to an efficient machine representation. The compression relies on the characteristic that a given compound is nearly identical orthographically to its constituent components, the only differences being changes in capitalization of the first letter, presence or absence of a space, and presence or absence of a linking morpheme. Such differences are reflected in orthographic change rules in the path traceback illustrated in FIG. 2, and can be used to compound or decompound a compound word that lacks a full written compound form and corresponding constituent components in the component lexicon.

To guard against recognition outputs that contain instances of isolated components which aren't valid words by themselves, the recognition system language model probabilities are transformed. For example, to recognize the German word "Kindstot" (child death), a recognition vocabulary might include the components "Kinds" and "Tot." If a user subsequently spoke a phrase containing the word "Kindstot," the recognizer would initially produce "Kinds Tot" and produce "Kindstot" in the recognition output However, "Kinds" is not a valid German word by itself and should not be present in a recognition output as an isolated word. For example, with "Kinds" in the recognition vocabulary, when a user says: "Das Kind isst Eier" (The child eats eggs), the recognizer could produce "Das Kinds Eier", which is not acceptable since Kinds is not a valid word on its own. Transformed language model probabilities are used to punish such a recognition hypothesis and avoid the undesirable result. Thus, it is ensured that the components "Kinds" and "Tots" are compounded correctly to form "Kindstot." Specifically, a preferred embodiment uses a penalizing backoff from bigram to unigram in the recognition language model when confronted with such invalid components as a predecessor. This maximizes the likelihood that such a component will be followed by another compoundable component.

Over-decompounding can also occur. For example, the word "plastics" could be improperly decompounded into the components "plas" and "tics." Over-decompounding adversely affects the recognition language model statistics, since plastics are not related in the real world to either "plas" or "tics," and could also lead to incorrect transcription. Over-decompounding may be controlled to a large degree by imposing a minimum component length requirement.

A further embodiment of the present invention handles the difficult situation of ambiguity with respect to compounding. Such ambiguity occurs when language usage is such that certain compound word components sometimes appear independently or isolated, and sometimes appear in compound word form. Difficult ambiguous compounding cases can be addressed via the common practice of recognition output alternatives, or "alts". In such an embodiment, the final recognition output may present the ambiguous components in compound form. Then, if a user selects the ambiguous component sequence for post-output correction, the system may offer the uncompounded components as a likely alt for corrective selection by the user.

One approach to implementing such a feature is to expand the size of the compound lexicon used by the system to include even compound words whose components are more likely to occur separately in the language than in compound form. Entries in the compound lexicon may then include an ambiguity handling field of 2 bits indicating whether a given entry is always, usually, or sometimes compounded. Specifically, a first value in the ambiguity handling field indicates that the components for that compound word should always be compounded when they are found together. A second value in the ambiguity handling field indicates that the components for that word should be compounded together for the "best" recognition hypothesis that is output to the user, but the uncompounded components also represent a valid alt for presentation to the user in the event that that word is selected for post-output correction. A third value in the ambiguity handling field indicates that the components for that compound word should not be compounded together in the "best" recognition hypothesis that is output to the user, but the compound word form represents a valid alt for presentation to the user in the event that that word is selected for post-output correction. Of course, in the event of three or more components occur together, the number of various compounding possibilities increases, but each such possibility may be handled similar to the manner just described.

What is claimed is:

1. A postprocessor of a speech recognition system for generating compound words from a recognition result having a sequence of recognized words representative of an input utterance, the sequence including compound word components, the postprocessor comprising:

a compound lexicon that contains a plurality of compound words composed of compound word components and connecting links; and a compounder that replaces, in the sequence of recognized words, adjacent words that have corresponding linked components in the lexicon with a compound word in the compound lexicon composed of the adjacent words.

2. A postprocessor according to claim 1, wherein the replacement with the compound word includes an adjustment of the components for agreement for at least one of number, person, gender, and tense.

3. A postprocessor according to claim 1, wherein the replacement with the compound word includes the addition of component-linking morphemes.

4. A postprocessor according to claim 1, wherein the components have a length greater than or equal to a selected minimum component length.

5. A postprocessor according to claim 1, wherein compound word entries in the compound lexicon include an ambiguity indicator field having a value indicating whether the components for a given compound word occur more frequently in compounded or uncompounded form.

6. A postprocessor according to claim 1, wherein the compounder produces an output representing a best recognition hypothesis and at least one alternative recognition hypothesis, such that when the compounder performs a given compound word replacement, one hypothesis is generated that contains the given compound word, and one hypothesis is generated that contains the uncompounded components of the given compound word.

7. A postprocessor according to claim 6, wherein when the compounder performs a compound word replacement, the best recognition hypothesis contains the given compound word.

8. A postprocessor according to claim 6, wherein when the compounder performs a compound word replacement, the best recognition hypothesis contains the uncompounded components of the given compound word.

9. A postprocessor according to claim 1, wherein the compound lexicon contains a given compound word only when the components of the given compound word are more likely to occur together in a compound word than to occur as separate words.

10. A postprocessor according to claim 1, wherein the compound lexicon contains a selected number of most frequently occurring compound words present in a text corpus.

11. An automatic speech recognition system having the postprocessor of claim 1.

12. An automatic speech recognition system according to claim 11, wherein the system is a large-vocabulary continuous speech recognition system.

13. A method of a speech recognition system for postprocessing a recognition result having a sequence of recognized words representative of an input utterance so as to generate compound words, the sequence including compound word components, the method comprising:
providing a compound lexicon that contains a plurality of compound words composed of compound word components and connecting links; and
replacing, in the sequence of recognized words, adjacent words that have corresponding linked components in the lexicon with a compound word in the compound lexicon composed of the adjacent words.

14. A method according to claim 13, wherein replacing with the compound word includes adjusting the components for agreement for at least one of number, person, gender, and tense.

15. A method according to claim 13, wherein replacing with the compound word includes adding component-linking morphemes.

16. A method according to claim 13, wherein the components have a length greater than or equal to a selected minimum component length.

17. A method according to claim 13, wherein compound word entries in the compound lexicon include an ambiguity indicator field having a value indicating whether the components for a given compound word occur more frequently in compounded or uncompounded form.

18. A method according to claim 13, wherein replacing with a compound word includes producing an output representing a best recognition hypothesis and at least one alternative recognition hypothesis, such that when replacing a given compound word, one hypothesis is generated that contains the given compound word, and one hypothesis is generated that contains the uncompounded components of the given compound word.

19. A method according to claim 18, wherein when replacing a given compound word, the best recognition hypothesis contains the given compound word.

20. A method according to claim 18, wherein when replacing a given compound word, the best recognition hypothesis contains the uncompounded components of the given compound word.

21. A method according to claim 13, wherein the compound lexicon contains a given compound word only when the components of the given compound word are more likely to occur together in a compound word than to occur as separate words.

22. A method according to claim 13, wherein the compound lexicon contains a selected number of most frequently occurring compound words present in a text corpus.

23. An automatic speech recognition system using the method of claim 13.

24. An automatic speech recognition system according to claim 23, wherein the system is a large-vocabulary continuous speech recognition system.

25. An automatic speech recognition system comprising:
a recognition engine that generates a recognition result having a sequence of recognized words representative of an input utterance, the sequence including compound word components, the engine using a recognition vocabulary of words and a language model which, for a given position in the sequence of recognized words and for selected words in the recognition vocabulary, associates an occurrence probability of such word occurring at such position;
a compound lexicon that contains a plurality of compound words composed of compound word components and connecting links; and
a compounder that replaces, in the sequence of recognized words, adjacent words that have corresponding linked components in the lexicon with a compound word in the compound lexicon composed of the adjacent words, wherein the language model occurrence probabilities prevent a given component in the lexicon from occurring in the recognition result unless the given component is adjacent to at least one other component such that, for the adjacent components, the lexicon contains linked entries corresponding to a compound word in the lexicon.

26. A system according to claim 25, wherein the replacement with the compound word includes an adjustment of the components for agreement for at least one of number, person, gender, and tense.

27. A system according to claim 25, wherein the replacement with the compound word includes the addition of component-linking morphemes.

28. A system according to claim 25, wherein the compound components have a length greater than or equal to a selected minimum component length.

29. A system according to claim 25, wherein compound word entries in the compound lexicon include an ambiguity indicator field having a value indicating whether the components for a given compound word occur more frequently in compounded or uncompounded form.

30. A system according to claim 25, wherein the compounder produces an output representing a best recognition hypothesis and at least one alternative recognition hypothesis, such that when the compounder performs a given compound word replacement, one hypothesis is generated that contains the given compound word, and one hypothesis is generated that contains the uncompounded components of the given compound word.

31. A system according to claim 30, wherein when the compounder performs a compound word replacement, the best recognition hypothesis contains the given compound word.

32. A system according to claim 30, wherein when the compounder performs a compound word replacement, the best recognition hypothesis contains the uncompounded components of the given compound word.

33. A system according to claim 25, wherein the compound lexicon contains a given compound word only when the components of the given compound word are more likely to occur together in a compound word than to occur as separate words.

34. A system according to claim 25, wherein the compound lexicon contains a selected number of most frequently occurring compound words present in a text corpus.

35. A system according to claim 25, wherein each compound word further includes an occurrence probability of such compound word occurring at the location of the compound word in the sequence of recognized words.

36. A system according to claim 35, wherein the occurrence probability of each compound word is determined based on the occurrence probability of one of the components composing that compound word.

37. A system according to claim 25, wherein the system is a large-vocabulary continuous speech recognition system.

38. A method of automatic speech recognition comprising:
    generating with a recognition engine a recognition result having a sequence of recognized words representative of an input utterance, the sequence including compound word components, the engine using a recognition vocabulary of words and a language model which, for a given position in the sequence of recognized words and for selected words in the recognition vocabulary, associates an occurrence probability of such word occurring at such position;
    providing a compound lexicon, the lexicon containing a plurality of compound words composed of compound word components and connecting links; and
    replacing, in the sequence of recognized words, adjacent words that have corresponding linked components in the lexicon with a compound word in the lexicon composed of the adjacent words,
wherein the language model occurrence probabilities prevent a given component in the lexicon from occurring in the recognition result unless the given component is adjacent to at least one other component such that, for the adjacent components, the lexicon contains linked entries corresponding to a compound word in the lexicon.

39. A method according to claim 38, wherein replacing with the compound word includes adjusting the components for agreement for at least one of number, person, gender, and tense.

40. A method according to claim 38, wherein replacing with the compound word includes adding component-linking morphemes.

41. A method according to claim 38, wherein the components have a length greater than or equal to a selected minimum component length.

42. A method according to claim 38, wherein compound word entries in the compound lexicon include an ambiguity indicator field having a value indicating whether the components for a given compound word occur more frequently in compounded or uncompounded form.

43. A method according to claim 38, wherein replacing with a compound word includes producing an output representing a best recognition hypothesis and at least one alternative recognition hypothesis, such that when replacing a given compound word, one hypothesis is generated that contains the given compound word, and one hypothesis is generated that contains the uncompounded components of the given compound word.

44. A method according to claim 43, wherein when replacing a given compound word, the best recognition hypothesis contains the given compound word.

45. A method according to claim 43, wherein when replacing a given compound word, the best recognition hypothesis contains the uncompounded components of the given compound word.

46. A method according to claim 38, wherein the compound lexicon contains a given compound word only when the components of the given compound word are more likely to occur together in a compound word than to occur as separate words.

47. A method according to claim 38, wherein each compound word further includes an occurrence probability of such compound word occurring at the location of the compound word in the sequence of recognized words.

48. A method according to claim 47, wherein the occurrence probability of each compound word is determined based on the occurrence probability of one of the components composing that compound word.

49. A method according to claim 38, wherein the system is a large-vocabulary continuous speech recognition system.

50. A method of preparing a speech recognition system to postprocess a recognition result having a sequence of recognized words representative of an input utterance so as to generate compound words, the sequence including compound word components, the system having a language model including n-gram word models, the method comprising:
    providing an initial component lexicon, the initial component lexicon containing a plurality of compound word components;
    comparing a corpus of words modeled by the system to the initial component lexicon, and creating entries in a compound lexicon for compound words in the corpus having compound word components in the initial component lexicon, thereby creating a compound lexicon that contains a plurality of compound words composed of compound word components and connecting links; and
    rewriting the language model n-grams of the compound words so as to form n-grams of the components.

51. A method according to claim 50, wherein providing an initial component lexicon includes providing a compound grammar specifying how compound word components may be combined into compound words.

52. A method according to claim 50, wherein the compound grammar uses rules based on a part-of-speech characteristic of each component.

* * * * *